United States Patent [19]

Rader

[11] Patent Number: 4,543,863

[45] Date of Patent: Oct. 1, 1985

[54] CONTROLLED SEVERING OF A CONTINUOUS WEB

[75] Inventor: Robert R. Rader, Port Huron, Mich.

[73] Assignee: Wirtz Manufacturing Company, Inc., Port Huron, Mich.

[21] Appl. No.: 570,698

[22] Filed: Jan. 16, 1984

[51] Int. Cl.[4] .......... B23Q 15/12

[52] U.S. Cl. .......... 83/76; 83/74

[58] Field of Search .......... 83/76, 74; 364/475

[56] References Cited

U.S. PATENT DOCUMENTS

| | | | |
|---|---|---|---|
| 3,668,957 | 6/1972 | Nido | 83/76 X |
| 3,774,016 | 11/1973 | Sterns et al. | 364/475 X |
| 4,015,183 | 3/1977 | Miyakita | 83/76 X |
| 4,287,797 | 9/1981 | Seragnoli | 83/76 X |
| 4,384,500 | 5/1983 | Friberg | 83/76 X |
| 4,387,614 | 6/1983 | Evans | 83/76 X |

OTHER PUBLICATIONS

Fairchild Industrial Products Division, Bulletin No. 212, Register Control.

Fairchild Industrial Products Division, Bulletin No. 213, Proportional Register Control.

*Primary Examiner*—James M. Meister

*Attorney, Agent, or Firm*—Barnes, Kisselle, Raisch, Choate, Whittemore & Hulbert

[57] ABSTRACT

Apparatus for severing a continuous web at preselected locations spaced lengthwise of the web which includes a first drive for advancing the web at substantially uniform velocity in the direction of its length through a predetermined fixed path. A circular mandrel is mounted for rotation adjacent to the web path and has a plurality of cutter blades at uniform angular intervals around the periphery thereof. A differential transmission couples the mandrel to the web drive and is controlled by a stepper motor to advance or retard angular velocity of the cutter mandrel as compared with linear velocity of the web. A pair of sensors are respectively responsive to motion of the web and rotation of the cutter blades toward the position of cutting engagement. A control circuit receives signals from the sensors and from a tachometer responsive to web velocity to control the stepper motor and thus to advance or retard rotation of the cutter mandrel so that the cutter blades engage and sever the webs at the preselected and desired web-sever locations.

13 Claims, 3 Drawing Figures

CONTROLLED SEVERING OF A CONTINUOUS WEB

The present invention is directed to controlled severing of a continuous length of web stock, and more particularly to an apparatus for cutting a continuous web moving in the direction of its length at preselected spaced locations in the web.

It is often desirable in the manufacture of products from continuous lengths of web stock accurately to control the cutting or severing thereof either to produce web segments of equal length or to locate accurately a particular point in each web segment. Such an operation becomes difficult to control where the web is elastic in the direction of its length. For example, in the manufacture of grids for lead-acid batteries, it has been proposed to provide the grids as a web formed in a continuous casting operation and to sever the web to form individual grid elements. Battery grids conventionally possess a finger or lug extending from one lateral grid edge. It is desirable to sever individual grids from the continuous web in such a manner that the lugs are accurately positioned with respect to the adjacent grid end so that, when a plurality of such grids are assembled into a battery case, the grid lugs will be aligned with each other to facilitate their connection to a battery terminal. It is also desirable to control closely the web location at which severing takes place. Devices heretofore proposed for accomplishing this end have not provided for continuous closed loop real time correction during grid manufacture, and in general do not produce desired results. This type of correction is necessary because successive grids in the web may vary in length as a result of stretching between the casting machine and the cut-off mechanism.

It is therefore a general object of the present invention to provide a technique for severing a continuously moving web at predetermined locations on the web, which technique is self-correcting "on the fly", that is, in real time during continuing operation. Another object of the invention is to provide a web severing technique as described which is self-adapting to web feed velocity, which automatically accommodates variations in web feed velocity and which possesses a broad correction range.

Further objects of the invention are to provide a web severing technique of the described type which finds particular utility in the manufacture of lead-acid battery grids, but which is at the same time readily adaptable to a wide variety of other applications.

Yet another object of the invention is to provide a web severing technique which is adapted for high speed continuous operation, which is economical to implement, and which is reliable over extended operation periods.

A still further object of the invention is to provide a web severing technique wherein required correction is implemented prior to each severing operation, and wherein such implementation is inhibited during the actual severing operation and while needed correction is sensed.

The invention, together with additional objects, features and advantages thereof, will be best understood from the following description, the appended claims and the accompanying drawings in which:

Figure 1:
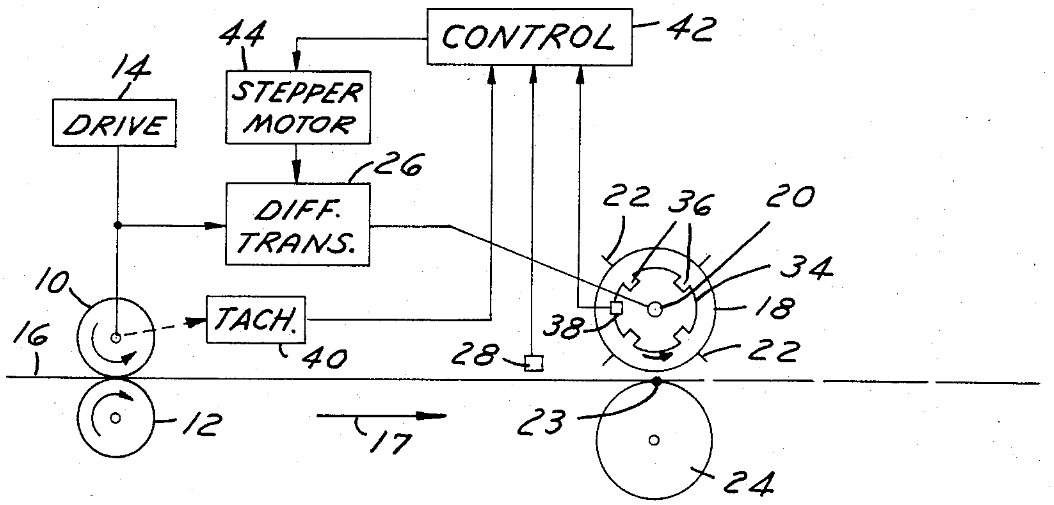
FIG. 1 is a schematic diagram of an apparatus for severing a continuous web, specifically a continuous web of battery grids, in accordance with the principles of the present invention.

Referring to FIG. 1, a pair of pinch rollers 10,12 are coupled to a drive motor 14 and are positioned to receive a continuous web 16 from a source not shown and for moving the web in the direction of its length through a fixed path at substantially uniform velocity. A circular mandrel or drum 18 is mounted on a drive shaft 20 downstream of rollers 10,12. A plurality of cutter blades 22 are mounted about the circumference of mandrel 18 at uniformly angularly spaced positions and project therefrom so as to engage and sever web 16 at a fixed position 23 in the web path of travel immediately beneath mandrel drive shaft 20. A back-up roller 24 is positioned beneath web 16 in alignment with cutter mandrel 18 to hold web 16 against downward flexure when engaged by successive cutter blades 22. Mandrel drive shaft 20 is coupled by a differential transmission 26 to web drive motor 14, which thus constitutes a common drive source for both web motion and cutter mandrel rotation.

Figure 2:
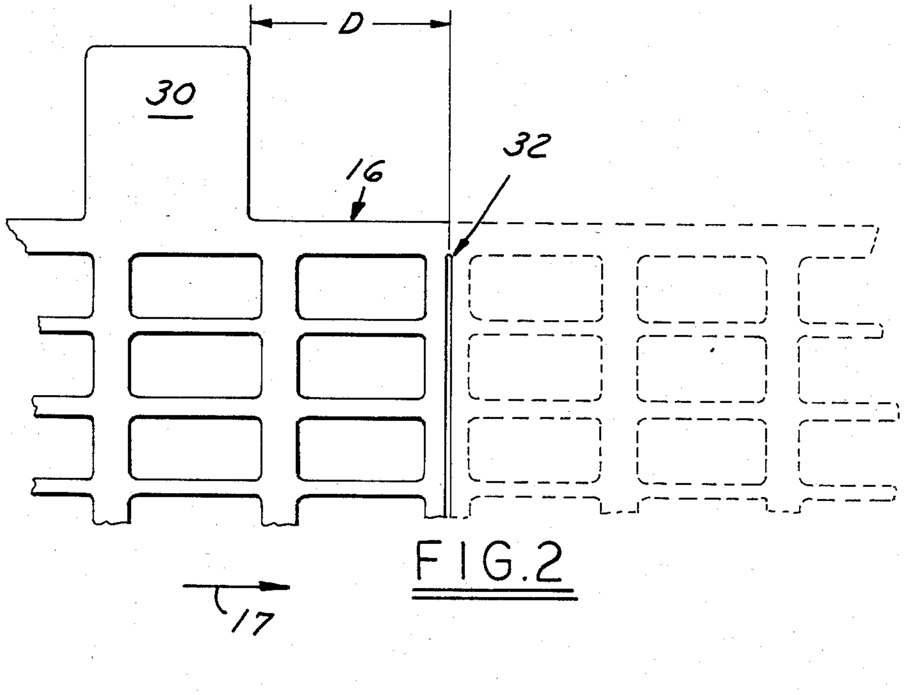
FIG. 2 is a fragmentary plan view of a portion of a battery grid web which illustrates the spaced locations at which the web is to be severed.

A first sensor 28 is positioned adjacent to the path of travel of web 16 and is responsive to web 16 for indicating approach to severing position 23 of a location at which web 16 is to be severed. For example, FIG. 2 is a fragmentary view of a battery grid web 16 travelling in the direction 17 wherein it is desired to sever individual grid plates from the web at a preselected distance D ahead of each grid lug 30. The open latticed configuration of the grid web, coupled with the malleable nature of the lead composition, contribute to lengthwise elasticity of the web, whereby the distance between successive lugs varies in actual operation. Sensor 28 in this preferred application of the invention comprises a slotted optical sensor positioned with respect to the path of web 16 so as to receive and detect passage of each lug 30, and thus to indicate approach of the desired sever line 32 to the web severing position. Turning again to FIG. 1, a plate or disc 34 is mounted on mandrel drive shaft 20 and has a plurality of slots 36 formed in the periphery thereof. Each slot 36 corresponds to, and in the embodiment of FIG. 1 is radially aligned with, a specific cutter blade 22 on mandrel 18. A second sensor 38, preferably a second slotted optical sensor, is disposed adjacent to mandrel drive shaft 20 and positioned so as to sense passage of the successive cutter-indicating slots 36 in disc 34. A tachometer 40, which may be of any suitable type, is coupled to the drive shaft of web drive roller 10. A control circuit 42 receives input signals from sensors 28,38 and from tachometer 40, and provides an output control signal to a stepper motor 44 which controls operation of differential transmission 26.

In general operation, web sensor 28 is responsive to each lug 30 of the battery grid web 16 to indicate approach of a preselected sever location 32 to the web severing position 23 beneath mandrel 18. In the working embodiment of the invention herein disclosed for use in conjunction with battery grids of the type illustrated in FIG. 2, it is preferred to equal to the nominal length of one battery grid plus the distance D by which the leading edge of each lug 30 is spaced upstream from the associated web sever location 32. In the same manner, sensor 38 is positioned to detect angular approach of a cutter blade 22 to the web severing position 23. In the working embodiment of the invention illustrated schematically in FIG. 1, wherein four cutter blades 22 are positioned at ninety degree spacings around mandrel 18, sensor 38 is positioned at an angle of ninety degrees ahead of cutting position 23. The diameter of mandrel 18, the angular spacing between cutter blades 22 and the nominal angular velocity of the cutter mandrel preferably are all selected such that coincident detection of a lug 30 at sensor 28 and a cutter blade 22 at sensor 38 will result in arrival of that cutter blade and the sever location 32 associated with that lug 30 at the cutting position 23 substantially simultaneously. In the event that the detection signals from sensors 28,38 are not coincident, control circuit 42 functions through stepper motor 44 and differential transmission 26 to advance or retard—i.e. increase or decrease—the angular velocity of cutter mandrel 18 by a controlled correction factor so that the web sever location 32 and the associated cutter blade 22 reach web cutting position 23 substantially simultaneously.

Figure 3:
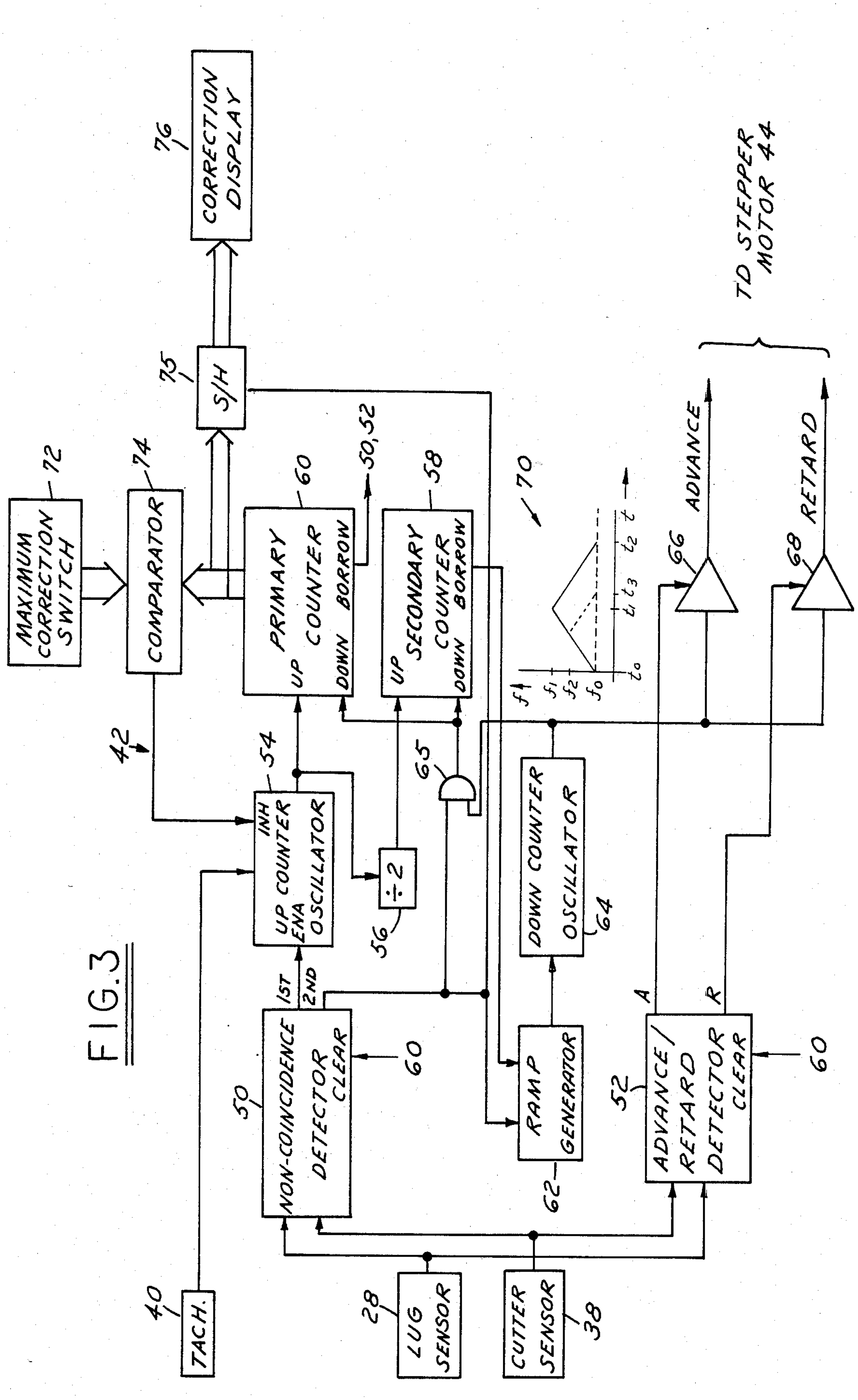
FIG. 3 is a functional block diagram of the apparatus control circuit illustrated in block form in FIG. 1.

FIG. 3 illustrates a presently preferred embodiment of control circuit 42 as comprising a non-coincidence detector 50 and an advance/retard detector 52, each connected to receive signals from lug sensor 28 and cutter sensor 38. Advance/retard detector 52 senses the order in which the sensor signals are received, and provides an advance control output signal A when lug sensor 28 is activated prior to cutter sensor 38, indicating that the velocity of the cutter mandrel must be advanced, and a retard control output signal R when the signal from cutter sensor 38 is received ahead of the associated signal from lug sensor 28, indicating that velocity of the cutter mandrel must be retarded. Non-coincidence detector 50 provides a first output signal upon receipt of the first sensor signal to initiate a correction measurement cycle retardless of which sensor signal occurs first, and a second output signal upon receipt of the second sensor signal which terminates the correction measurement cycle and initiates the correction (advance or retard) implementation cycle. In the event that the signals from sensors 28,38 occur substantially simultaneously, indicating that the relative velocities of web 16 and cutter mandrel 18 (FIG. 1) require no correction, detectors 50,52 provide no output signals.

An up-count oscillator 54, which preferably comprises a variable frequency oscillator, receives as an enabling input the first sensor output signal of noncoincidence detector 50, and receives a frequency control input from web velocity tachometer 40. Upon receipt of an enabling input from detector 50, oscillator 54 provides a pulsed periodic output signal at a frequency which varies in proportion to web feed velocity. The output of oscillator 54 is connected to the up-counting input of a primary up/down counter 60. The output of oscillator 54 is also connected through a divide-by-two counter 56 to the up-counting input of a secondary up/down counter 58. Counters 58,60 thus up-count during a correction measurement cycle measured by the duration of the first output signal from non-coincidence detector 50. Counters 58,60 cease operation when the output of detector 50 enabling operation of oscillator 54 is terminated, which occurs when the second sensor signal is received by detector 50. The counts in counter 60 at this point thus indicates the amount of velocity correction needed at the cutter mandrel so as to bring the advancing cutter blade into engagement with the advancing web at the desired web location. It will be appreciated that the amount of velocity correction so indicated is relative to web feed velocity since the frequency of up-count oscillator is directly controlled by web feed tachometer 40. The count in secondary counter 58 is equal to one-half of the count in primary counter 60.

The second output signal from non-coincidence detector 50, which indicates receipt of the second sensor signal, is fed to the enable input of a ramp signal generator 62 to initiate a mandrel velocity correction cycle. A down-count oscillator 64, which comprises a variable frequency oscillator, receives a frequency control input from ramp generator 62, and provides a pulsed periodic output signal at a frequency which varies as a function of the bidirectional ramp signal output of generator 62. The output of oscillator 64 is fed to the down-counting inputs of counters 58,60 through an AND gate 65, which receives an enabling second input from the second output of detector 50. The borrow output of counter 58 is connected to the ramp direction control input of generator 62. The borrow output of counter 60 is connected to the clear inputs of detectors 50,52. A pair of amplifiers 66,68 receive signal inputs from the output of down-count oscillator 64, and receive respective control inputs from the advance and retard outputs A,R of detector 52. The outputs of amplifiers 66,68 are connected to associated advance and retard directional inputs of stepper motor 44 (FIG. 1). The graph 70 in FIG. 3 illustrates the output frequency of oscillator 64 versus time for one correction implementation cycle.

In operation, at the start of a correction implementation cycle, counter 60 has accumulated a count indicative of total required velocity correction, and counter 58 has accumulated half of such count. Upon receipt of the second sensor signal at time $t_0$, ramp generator 62 is enabled and the output thereof to the control input of oscillator 64 varies in a given direction (either upwardly or downwardly) linearly with time. The pulsed output frequency of down-count oscillator 64 thus increases linearly from a base frequency $f_0$ equal to the motor base speed. This increasing-frequency pulsed signal is fed to the down-counting inputs of counter 58,60 and also to the signal inputs of amplifiers 66,68. The increasing-frequency pulsed correction signal is thus fed by amplifier 66 or 68 to the appropriate input of stepper motor 44, depending upon whether advance or retard correction is indicated by detector 52. By increasing the frequency of the pulsed correction signal linearly from the base frequency at the start of a correction implementation cycle, the invention accommodates the inherent inertia of stepper motor 44, so that no correction pulses will be lost or ignored by the stepper motor. Most preferably, the slope or gradient of the ramp generator output, and thus the slope or gradient of the frequency output of oscillator 64, is selected in accordance with the acceleration characteristics of the particular stepper motor 44 which is employed.

Such pulsed correction at increasing frequency is continued until counter 58 down-counts to zero, indicating that half of the needed correction has been implemented. At this point, time $t_1$ in illustration 70, the borrow output of counter 58 switches the ramp direction control input to generator 62 so as to provide to the frequency control input of oscillator 64 a signal of equal but opposite slope to that previously provided. Thus, the frequency of the pulsed correction output signal from oscillator 64 decreases from a maximum frequency $f_1$ obtained just prior to occurrence of the borrow output from counter 58. Such decreasing-frequency correction signals continue to drive stepper motor 44 in the desired correction direction, i.e. either advance or retard, but at a decelerating rate which will bring stepper motor 44 to zero motion at the end of the correction implementation cycle without sudden jerks or deceleration. When the ramp generator control output has returned to the original level at time $t_2$, the frequency of down-count oscillator 64 will have returned to the base frequency. When primary counter 60 down-counts to zero, the borrow output thereof resets detectors 50,52 and the correction implementation cycle is completed. All counters and detectors are reset at this point preparatory to initiation of the next correction measurement cycle.

It will be appreciated that the time duration of each correction implementation cycle depends upon the amount of correction needed. For example, referring again to graphic illustration 70 in FIG. 3, a relatively large correction is illustrated in solid lines and has been discussed above. Such correction would require substantially longer time to implement than would the relatively minor correction illustrated in phantom. It will be noted that the acceleration and deceleration frequency slopes of oscillator 64 remain the same regardless of the amount of correction needed. As previously indicated, these slopes are selected as a function of the stepper motor to be employed. However, where little correction is needed, a lower maximum frequency $f_2$ is reached, and the time duration $t_3-t_0$ of the correction implementation cycle is substantially less.

It will be appreciated that there will be a maximum correction which may be implemented for a given set of dynamic conditions. The conditions which must be considered are the dynamic capabilities of stepper motor 44 and differential transmission 26 (FIG. 1), the velocities of web 16 and cutter mandrel 18, and the angular separation between cutter blades 22 on mandrel 18. It is deemed undesirable in accordance with the preferred implementation of the invention herein disclosed to extend a correction cycle beyond the point at which the cutter blade engages the web. In order to prevent such an occurrence, the preferred embodiment of the invention illustrated in FIG. 3 includes a bank of thumbwheel switches 72 or the like for operator entry of the maximum available correction during a single correction cycle. The maximum available correction may be determined mathematically or empirically by incrementing allowable correction during actual operation. The data outputs of primary counter 60 are connected to one set of inputs of a comparator 74 which receives a second set of inputs from switches 72. The output of comparator 74, which indicates equality between the primary counter and switch output signals, is connected to a third input of up-count oscillator 54 to inhibit further operation thereof. Thus, where needed correction measured during a correction measurement cycle exceeds the maximum correction capacity indicated by switches 72, further operation of oscillator 54 is inhibited. At the end of the correction measurement cycle, the counts in counters 60,58 will be at the maximum allowable levels, but will not be sufficient to obtain complete correction during the succeeding correction implementation cycle. However, further correction will be implemented during the next correction cycle, and the system will eventually operate as desired.

The data output of primary counter 60 is also connected to the signal inputs of a sample-and-hold circuit 75, which has data outputs connected to a correction display 76 which may be monitored by an operator. The control input of sample-and-hold circuit 75 is connected to receive the second output signal from detector 50. Thus, the required amount of correction, or maximum available correction where the required correction exceeds the maximum, is stored in sample-and-hold circuit 75 and displayed to an operator at the beginning of a correction cycle. Preferably, sample-and-hold circuit 75 or display 76 includes a timer or other means for updating the correction display only periodically, such as once per second.

There has thus been disclosed an apparatus for severing a continuous web at preselected locations spaced lengthwise of the web which fully satisfies all of the objects and aims previously set forth. For example, in the preferred embodiment of the invention hereinbefore disclosed in detail, the variable frequency pulsed correction signals to stepper motor 44 are specifically adapted to accommodate the acceleration and deceleration characteristics thereof for more accurate operation during the correction implementation cycle. Provision of tachometer 40 responsive to web velocity to control the count frequency during the correction measurement cycle accommodates variations in the output of drive motor 14 while maintaining accuracy of implemented correction. Correction is implemented in real time between each severing operation. However, the correction implementation cycle does not overlap either the correction accumulation cycle or the severing operation.

The invention has been disclosed in conjunction with its presently preferred application to manufacture of battery grids. However, it will be readily apparent that the invention is not limited to such preferred application, and may be readily employed in other applications wherein it is desired to sever a continuous web at preselected detectable locations spaced lengthwise of the web. The invention, in its broadest aspects, also contemplates modifications to the preferred embodiment. For example, differential transmission 26 could be connected between drive motor 14 and web roller 10, with drive motor 14 being directly coupled to mandrel drive shaft 20. In such a modification, cutter angular velocity would be substantially uniform and web velocity would be advanced or retarded as a function of needed correction. The preferred embodiment of the invention illustrated in FIG. 2 has the advantage over such modification of eliminating difficulties that would be associated with elasticity of web 16 and acceleration or deceleration thereof during the correction implementation cycle.

Another modification to the illustrated embodiment of the invention would contemplate differing drive sources for the web and the cutter mandrel. However, use of a common drive source 14 has the advantage that any variation in the output thereof is automatically reflected in the velocities of both the web and mandrel. It is also envisioned that tachometer 40 could be eliminated and up-count oscillator 54 could be a constant-frequency oscillator where web velocity is closely controlled and remains constant. Sensors 28,38 could be other than optical sensors where desired. The invention contemplates the foregoing and all other alternatives, modifications and variations as fall within the spirit and broad scope of the appended claims.

The invention claimed is:

1. Apparatus for severing a continuous web at preselected locations spaced lengthwise of the web comprising first drive means for continuously moving the web in the direction of its length through a fixed path, severing means positioned adjacent to said path and including second drive means for periodically moving said severing means into engagement with said web at a first predetermined fixed position in said path, common drive means connected to one of said first and second drive means and differential transmission means connecting said common drive means to the other of said first and second drive means, said differential transmission means including a stepper motor for selectively advancing or retarding velocity of said other of said first and second drive means relative to velocity of said one of said first and second drive means.

first sensor means comprising a first sensor disposed in a second fixed position along said path and responsive to motion of said web for providing a first sensor signal indicative of a predetermined spatial relationship between a said preselected location in said web and said first fixed path position, second sensor means comprising a second sensor disposed in fixed position relative to motion of said severing means for providing a second sensor signal indicative of a predetermined spatial relationship between said severing means and said first fixed path position, and controlling means comprising counter means including a first counter and first oscillator means including means responsive to said one of said drive means for controlling said counter means as a function of velocity of said one of said drive means, means responsive to occurrence of the first of said first and second sensor signals for activating said counter means, means responsive to occurrence of the other of said first and second sensor signals to terminate operation of said counter means, at which point said counter means has a count output indicative of an amount of required motion correction, and means including second oscillator means responsive to said count output of said counter means for selectively applying pulsed advance or retard correction signals to said stepper motor for selectively advancing or retarding motion of the other of said first and second drive means relative to said one of said first and second drive means following occurrence of said other of said sensor signals, said second oscillator means comprising means for varying the frequency of said correction signals over a control cycle in a manner predetermined not to exceed the acceleration and deceleration capabilities of said stepper motor.

2. The apparatus set forth in claim 1 wherein said frequency varying means comprises means for uniformly increasing said frequency during a first portion of said control cycle and for uniformly decreasing said frequency during a second portion of said control cycle.

3. The apparatus set forth in claim 2 wherein said frequency varying means comprises means for generating a bidirectional ramp control signal having a first slope during said first portion of said control cycle and a second slope during said second portion of said control cycle equal but opposite to said first slope, and a controlled oscillator having an output frequency which varies as a function of said bidirectional ramp control signal.

4. The apparatus set forth in claim 3 wherein said means for generating said ramp control signal includes means responsive to said counter means for switching said ramp control signal between said first and second slopes.

5. The apparatus set forth in claim 4 wherein said counter means further includes an up/down second counter having a down-counting input connected to said second oscillator means, an up-counting input and a borrow output, wherein said counter means further comprises divide-by-two counter means connected between said first oscillator means and said up-counting input, and wherein said ramp signal generating means includes means responsive to said borrow output for switching between said slopes.

6. The apparatus set forth in claim 5 wherein said controlling means further comprises means for indicating maximum available correction between cycles of said cutter, and comparator means responsive to said count output and to said maximum-correction indicating means for inhibiting further operation of said counter means.

7. The apparatus set forth in claim 6 further comprising display means responsive to said count output for indicating said amount of required motion correction.

8. The apparatus set forth in claim 1 wherein said severing means comprises a rotatable cutter positioned adjacent to said path and responsive to said second drive means for continuous rotation periodically into and out of severing engagement with said web.

9. Apparatus for severing a continuous web at preselected locations spaced lengthwise of the web comprising first drive means for continuously moving said web at substantially uniform velocity in the direction of its length through a predetermined path, a circular mandrel mounted for rotation adjacent to said path and having a plurality of cutter blades at uniform angular intervals around the periphery thereof, second drive means for continuously rotating said mandrel so as to rotate said cutter blades into and out of successive engagement with said web at a predetermined first fixed position in said path, common drive means coupled to said first drive means, controlled transmission means coupling said common drive means to said second drive means, said controlled transmission means including stepper motor means coupled to control said transmission means and having first and second inputs for receiving pulsed advance and retard motor control signals for selectively advancing and retarding velocity of said second drive means relative to said first drive means, first sensor means disposed at a second fixed position adjacent to said path and responsive to said web to provide a first sensor signal indicative of a predetermined spatial relationship between one said preselected location on said web and said first fixed position, second sensor means responsive to rotation of said mandrel to provide a second sensor signal indicative of a predetermined spatial relationship between one said cutter blade and said first fixed position, and control means including digital counter means responsive to said sensor signals in a first mode of operation to accumulate a count responsive to separation between said first and second sensor signals and indicative of total needed advance or retard correction, means responsive to said counter means in a second mode of operation for generating pulsed correction signals, and steering means responsive to sequence of occurrence of said first and second sensor signals for selectively feeding said pulsed correction signals to one or the other of said first and second motor inputs for controlling said second drive means and rotation of said mandrel so that said one cutter blade and said one preselected location on said web reach said first path position substantially simultaneously, said count-responsive means comprising a first variable frequency oscillator having a frequency control input, and a control circuit responsive to said counter means in said second mode of operation to provide a control signal to said frequency control input having a first gradient which uniformly increases the frequency of said pulsed correction signal to uniformly accelerate said stepper motor, followed by a second gradient equal and opposite to said first gradient to uniformly decelerate said stepper motor, said first and second gradients being of equal time duration.

10. The apparatus set forth in claim 9 wherein said digital counter means comprises an up/down counter having an up-counting input, a down-counting input connected to said first oscillator and a borrow output, and a second oscillator having an output connected to said up-counting input so as to store in said counter a said count equal to one-half of the total number of necessary correction pulses, said control circuit having an input connected to said borrow output for switching between said gradients.

11. The apparatus set forth in claim 10 wherein said second oscillator comprises a second variable frequency oscillator having a frequency control input, and wherein said apparatus further comprises means responsive to velocity of said web in said path for controlling the output frequency of said second oscillator.

12. The apparatus set forth in claim 11 wherein said second oscillator means has a base frequency equal to the base speed of said stepper motor, said frequency increasing from and decreasing to said base frequency during said first and second portions of said control cycle.

13. The apparatus set forth in claim 9 wherein said pulsed correction signal from said first oscillator has a base output frequency equal to the base speed of said stepper motor, said pulsed correction signal being fed continuously to said motor during both said first and second modes of operation so as to enhance acceleration and deceleration of said motor during said second mode of operation.

* * * * *